United States Patent
Niwa et al.

(10) Patent No.: US 8,793,051 B2
(45) Date of Patent: Jul. 29, 2014

(54) CONTROL SYSTEM FOR AIR CONDITIONING APPARATUS

(75) Inventors: Kazuki Niwa, Aichi (JP); Makoto Hattori, Aichi (JP); Toyohisa Kawashima, Aichi (JP); Masahiko Asai, Aichi (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 412 days.

(21) Appl. No.: 13/057,396

(22) PCT Filed: Dec. 28, 2009

(86) PCT No.: PCT/JP2009/071762
§ 371 (c)(1),
(2), (4) Date: Feb. 3, 2011

(87) PCT Pub. No.: WO2010/079717
PCT Pub. Date: Jul. 15, 2010

(65) Prior Publication Data
US 2011/0190981 A1  Aug. 4, 2011

(30) Foreign Application Priority Data

Jan. 9, 2009 (JP) ................................. 2009-003709

(51) Int. Cl.
*G06F 7/00* (2006.01)
*G05D 3/00* (2006.01)

(52) U.S. Cl.
USPC ................................................ 701/36; 701/1

(58) Field of Classification Search
USPC ........................................................ 701/36, 1
See application file for complete search history.

(56) References Cited

U.S. PATENT DOCUMENTS

| | | | |
|---|---|---|---|
| 6,812,589 B1 | 11/2004 | Fey et al. | |
| 2005/0141154 A1* | 6/2005 | Consadori et al. | 361/62 |
| 2008/0177919 A1 | 7/2008 | Miyazawa | |
| 2011/0187184 A1* | 8/2011 | Ichikawa | 307/10.1 |

FOREIGN PATENT DOCUMENTS

| | | |
|---|---|---|
| CN | 1402101 A | 3/2003 |
| CN | 1524720 A | 9/2004 |
| DE | 103 47 839 A1 | 4/2005 |
| EP | 1 858 206 A1 | 11/2007 |
| JP | 2004-507395 A | 3/2004 |

(Continued)

OTHER PUBLICATIONS

JP2007-145293 JPO English Translation.*

(Continued)

*Primary Examiner* — Ian Jen
(74) *Attorney, Agent, or Firm* — Westerman, Hattori, Daniels & Adrian, LLP (57) ABSTRACT

The electrical power consumption and cost of a control system for an air conditioning apparatus are reduced. A control system for an air conditioning apparatus mounted in a vehicle includes a plurality of vehicle-side ECUs (control units) that control devices provided in the air conditioning apparatus; and a signal control unit that controls the plurality of vehicle-side ECUs wherein the plurality of vehicle-side ECUs are divided into groups each having a common ON/OFF combination for the individual operating modes of the vehicle, and the vehicle-side ECUs belonging to the same group are connected by a common signal line; and the signal control unit sends ON and OFF signals depending on the operating mode of the vehicle to the signal lines.

5 Claims, 5 Drawing Sheets

(56) References Cited

FOREIGN PATENT DOCUMENTS

| JP | 2004-147379 A | 5/2004 |
|----|---------------|--------|
| JP | 2005-199997 A | 7/2005 |
| JP | 2005-219522 A | 8/2005 |
| JP | 2007-145293 A | 6/2007 |

OTHER PUBLICATIONS

Extended European Search Report dated Mar. 5, 2013, issued in corresponding European Patent Application No. 09837602.3.
Korean Decision to Grant Patent dated Apr. 22, 2013, issued in corresponding Korean Patent Application No. 10-2011-7002597. Relevance—"The Decision to Grant a Patent has bee received."
Chinese Office Action dated Aug. 20, 2012, issued in corresponding Chinese Patent Application 200980129917.9, (14 pages). With English Translation.
Korean Office Action dated Oct. 11, 2012, issued in corresponding Korean Patent Application No. 10-2011-7002597, (6 pages). With English Translation.
International Search Report of PCT/JP2009/071762, date of mailing Jan. 26, 2010.
Decision to Grant a Patent dispatched Nov. 5, 2013 in corresponding Japanese Patent Application No. JP-2009-003709. English Translation (six pages).
The Notification of grant of invention patent has been received in corresponding Chinese application No. 200980129917.9, mailed Aug. 6, 2013. Explanation of relevancy—"The Notification of grant of invention patent has been received."
Communication Under Rule 71(3) EPC, dated Mar. 31, 2014, issued in European Patent Office Application No. 09837602.3-1756 (7 pages).

* cited by examiner

CONTROL SYSTEM FOR AIR CONDITIONING APPARATUS

TECHNICAL FIELD

The present invention relates to a control system for an air conditioning apparatus.

BACKGROUND ART

Electric compressors having a configuration in which an electric motor is integrated in a housing are used as compressors for air conditioning apparatuses installed in electric cars or hybrid cars. The electric compressors generally incorporate an inverter, on the periphery of the housing, that converts DC power supplied from a high-voltage power supply to three-phase AC power and that supplies the power to the electric motor via a glass-sealed terminal, so that the rotational speed of the compressor-driving electric motor can be variably controlled.

In the related art, for example, in electric cars and hybrid cars, operation of an electric compressor for an air conditioning apparatus to cool a battery during charging of the battery is known. To operate the electric compressor, a controller area network (CAN) communication line is used in which a control and communication circuit provided on the CPU board of the inverter and vehicle-side control units provided at the vehicle side are connected via a communication cable.

CITATION LIST

Patent Literature

{PTL 1} Japanese Translation of PCT International Application, Publication No. 2004-507395

SUMMARY OF INVENTION

Technical Problem

However, since the CAN communication has only one system, all devices other than the device to be operated must be operated to ensure communication, thus posing the problem of wasteful power consumption.

Figure 5:
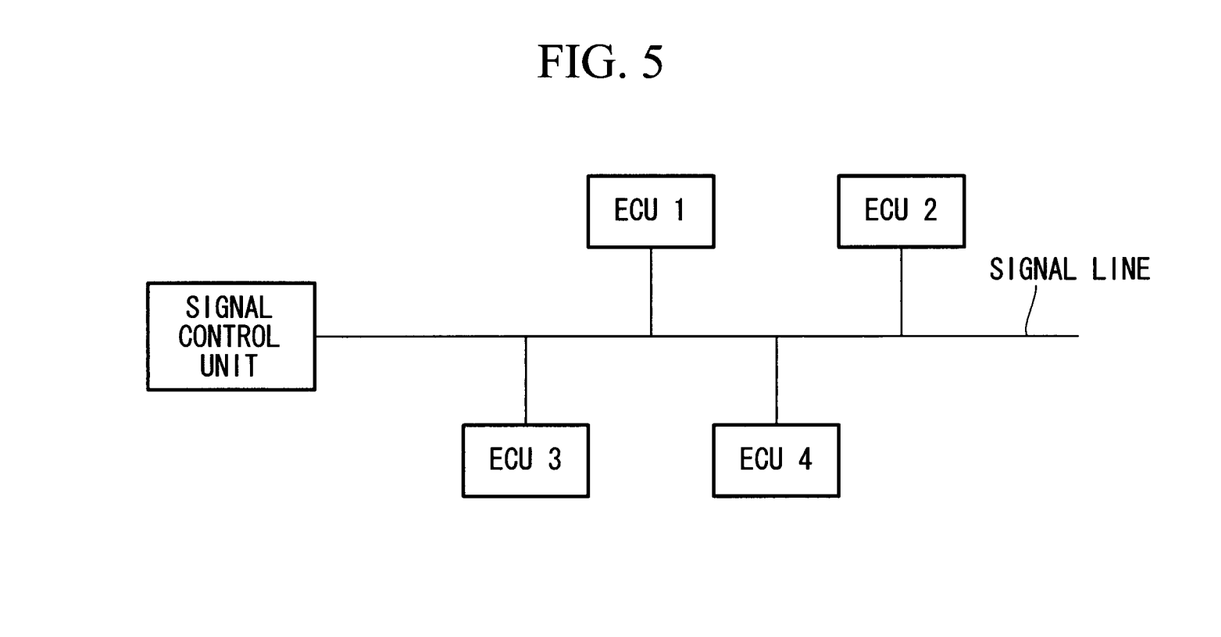
FIG. 5 is a diagram illustrating the connection between conventional vehicle-side control units and signal lines other than a CAN.

Furthermore, since signal lines other than the CAN are also connected through one system line, as shown in FIG. 5, all the devices other than the device to be operated must be operated, as in the case of the CAN, thus posing the problem of wasteful power consumption.

The present invention is made to solve the above problems, and it is an object thereof to provide a control system for an air conditioning apparatus in which wasteful power consumption can be suppressed, and costs can be reduced.

Solution to Problem

The present invention adopts the following solutions to solve the problems described above.

An aspect of the present invention is a control system for an air conditioning apparatus mounted in a vehicle, including a plurality of control units that control devices provided in the air conditioning apparatus; and a signal control unit that controls the plurality of control units, wherein the plurality of control units are divided into groups each having a common ON/OFF combination for the individual operating modes of the vehicle, and the control units belonging to the same group are connected by a common signal line; and the signal control unit sends ON and OFF signals depending on the operating mode of the vehicle to the individual signal lines.

With such a configuration, the control system for an air conditioning apparatus mounted in a vehicle is provided with a plurality of control units that control devices provided in the air conditioning apparatus. The plurality of control units are divided into groups each having a common starting/stopping (ON/OFF) combination for the operating modes of the vehicle, and control units belonging to the same group are connected to a common signal line. The signal lines that the control units of the individual groups connect are connected to the signal control unit, and ON and OFF signals depending on the operating modes of the vehicle are transmitted from the signal control unit to the individual control units through the signal lines.

Since the control units that perform the same operations (starting/stopping) for the individual operating modes of the vehicle are divided into groups, and the groups are individually connected through common signal lines in this way, the number of control units to be operated can be limited, thus allowing power consumption to be reduced. Furthermore, since the signal lines are grouped depending on the operating modes of the vehicle, the devices can be easily turned on and off, depending on the operating modes, by the signal control unit controlling the ON and OFF signals. Examples of the signal control unit include a wakeup control ECU (electric control unit), a diagnostic ECU for operating a self-diagnosis function, and a dedicated ECU provided depending on the application. Examples of the operating modes include air conditioning during the normal operation of the vehicle, charging of the vehicle, regenerative power generation, driving, and plugged-in.

Advantageous Effects of Invention

The present invention provides the advantages of suppressing wasteful power consumption and reducing cost.

DESCRIPTION OF EMBODIMENTS

An embodiment in which a control system for an air conditioning apparatus according to the present invention is applied to an inverter-integrated electric compressor will be described hereinbelow with reference to the drawings.

Figure 1:
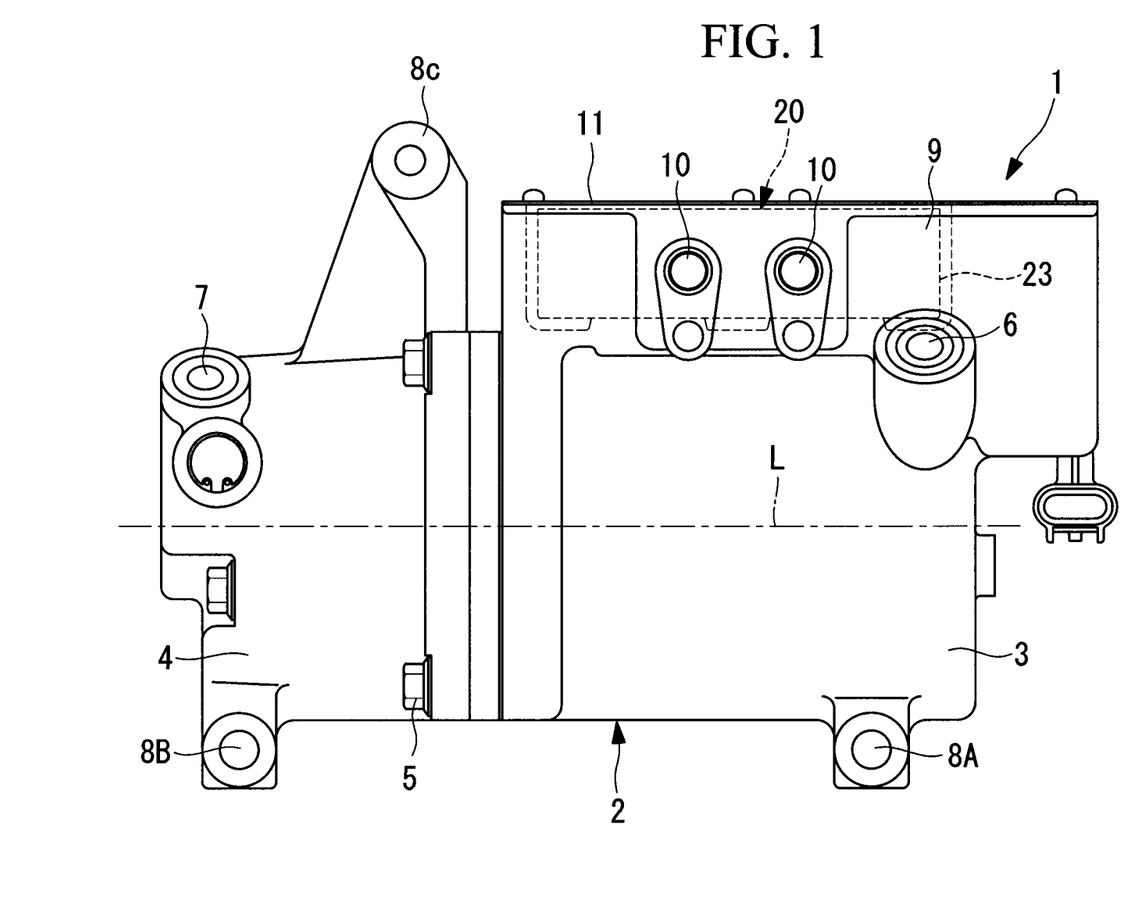
FIG. 1 is a side view of an inverter-integrated electric compressor according to an embodiment of the present invention.

FIG. 1 is an external side view of an inverter-integrated electric compressor according to an embodiment of the present invention.

An inverter-integrated electric compressor 1 includes a housing 2 that forms the outer shell thereof. This housing 2 is constructed by fastening together a motor housing 3 accommodating an electric motor (not shown) and a compressor housing 4 accommodating a compression mechanism (not shown) with bolts 5. The motor housing 3 and the compressor housing 4 are pressure-resistant containers formed by aluminum die casting.

The electric motor and the compression mechanism (not shown) accommodated in the housing 2 are joined together via a motor shaft and are configured such that the compression mechanism is driven by the rotation of the electric motor. A refrigerant intake port 6 is provided at one end of the motor housing 3 (at the right in FIG. 1), and low-temperature, low-pressure refrigerant gas taken into the motor housing 3 through the refrigerant intake port 6 flows around the electric motor along the direction of a motor axis L and is then taken into the compression mechanism, where it is compressed. The inverter-integrated electric compressor 1 is configured so that the high-temperature, high-pressure refrigerant gas compressed by the compression mechanism is discharged into the compressor housing 4 and is expelled outside through a discharge port 7 provided at one end of the compressor housing 4 (at the left in FIG. 1).

The housing 2 has mounting legs 8A, 8B, and 8C at three positions, for example, two positions on the bottom at one end of the motor housing 3 (at the right in FIG. 1) and on the bottom at one end of the compressor housing 4 (at the left in FIG. 1) and one position on the top of the compressor housing 4. The inverter-integrated electric compressor 1 is mounted at a vehicle side in such a manner that the mounting legs 8A, 8B, and 8C are fixed to a side wall or the like of a driving motor disposed in the engine compartment of the vehicle with a bracket and bolts.

A box-shaped inverter accommodating section 9 is integrally formed on the top of the periphery of the motor housing 3. The inverter accommodating section 9 has a box shape that is open at the top and is surrounded by a peripheral wall with a predetermined height and has two cable lead-out ports 10 at one side. Furthermore, the top of the inverter accommodating section 9 is sealed with a cover member 11 that is fixed with screws.

Figure 2:
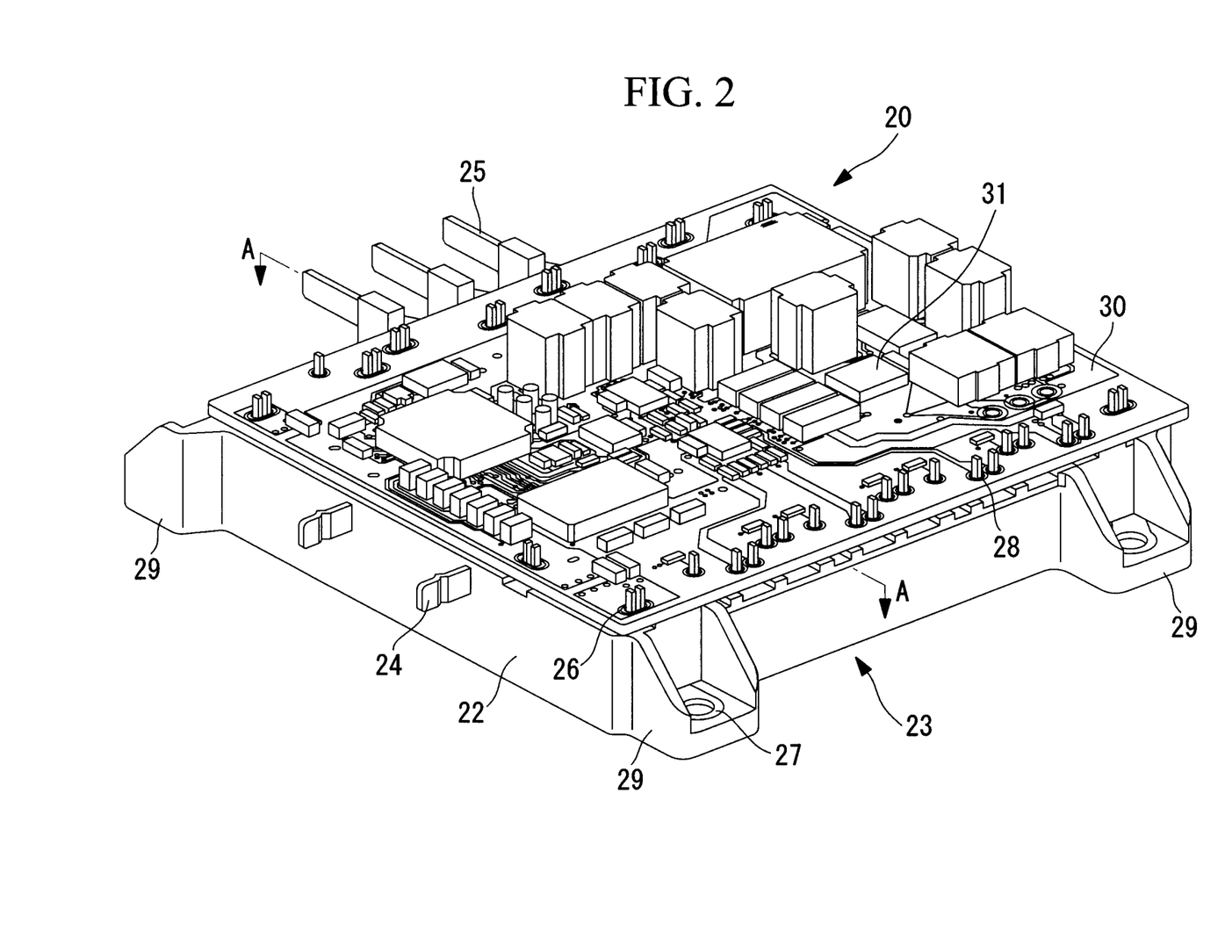
FIG. 2 is a perspective view of an inverter installed in the inverter-integrated electric compressor shown in FIG. 1.
Figure 3:
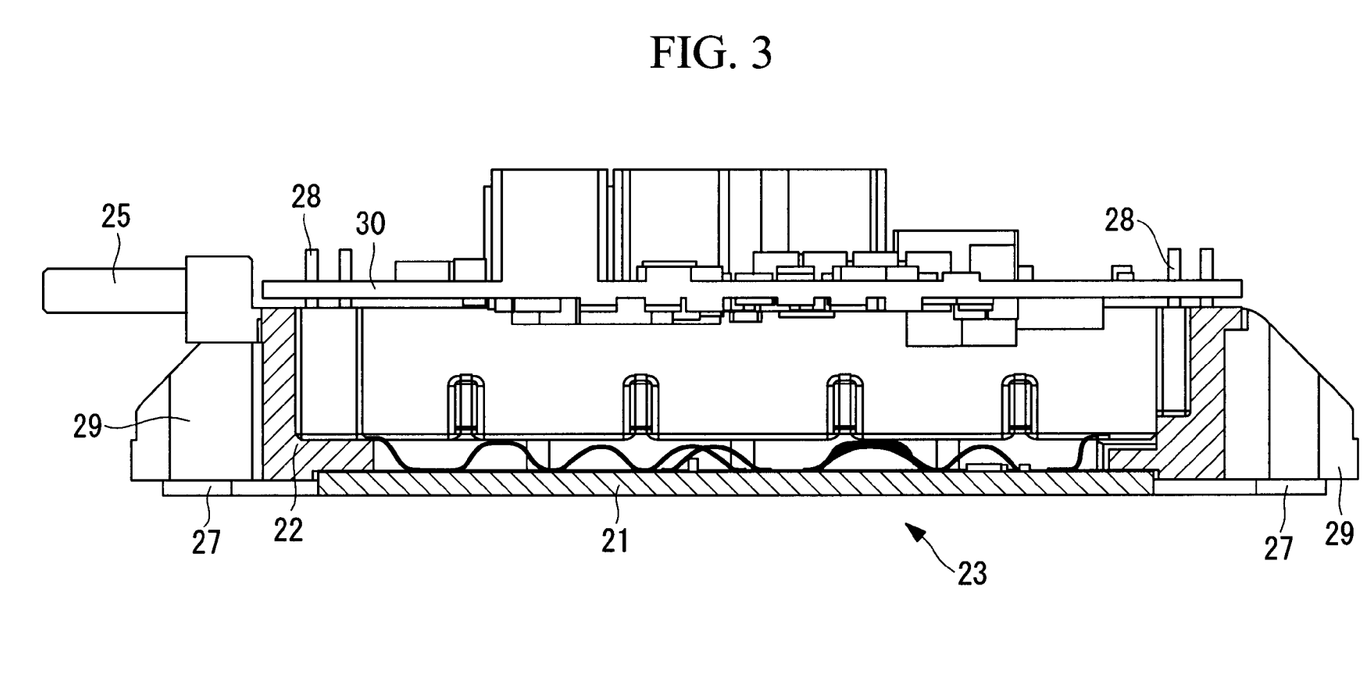
FIG. 3 is a cross-sectional view of the inverter shown in FIG. 2, taken along line A-A.

The inverter accommodating section 9 accommodates an inverter 20 that converts DC power supplied from a high-voltage power supply unit, a battery unit, or the like (not shown) mounted in the vehicle through a high-voltage cable to three-phase AC power and that supplies the AC power to the electric motor accommodated in the motor housing 3. FIG. 2 is a perspective view of the inverter 20, and FIG. 3 is a cross-sectional view taken along line A-A in FIG. 2.

The inverter 20 is provided with an inverter module 23 in which a switching circuit constituted by a plurality of semiconductor switching devices formed of IGBTs (not shown) or the like is installed and in which a power system board 21 formed of an aluminum plate on which a snubber capacitor, a discharging resistor and so on are mounted and a plastic case 22 are integrated by insert forming. The top of the power system board 21 is filled with thermosetting epoxy resin (not shown), so that the high-voltage switching circuit is sealed with the resin for insulation and moisture proofing.

The plastic case 22 has, in addition to the power system board 21, P-N terminals 24 connected to a high-voltage power supply, U-V-W terminals 25 that supply three-phase AC power to the electric motor, grounds 26 and ground terminals 27, a large number of connecting terminals 28 that connect between the power system board 21 and a CPU board 30, to be described later, etc. which are integrated by insert forming. The plastic case 22 has a rectangular shape and has the P-N terminals 24 protruding from one side thereof along the side of the inverter accommodating section 9 in which the cable lead-out ports 10 are provided and the U-V-W terminals 25 protruding from one side close to this side and adjacent to the compressor housing 4.

Furthermore, securing legs 29 that are fastened to the bottom of the inverter accommodating section 9 with bolts are integrally formed at the individual corners of the plastic case 22. These securing legs 29 are provided with the ground terminals 27 through which bolts can pass. By securing the plastic case 22 to the bottom of the inverter accommodating section 9 with the bolts, the power system board 21 and the CPU board 30, to be described later, are configured to be grounded to the casing.

The CPU board (printed board) 30, which is slightly larger than the plastic case 22, is disposed on the upper surface of the plastic case 22 constituting the inverter module 23 in such a manner as to be connected to the large number of connecting terminals 28 and the grounds 26. The CPU board 30 implements a control and communication circuit constituted by a device operated at a low voltage, such as a CPU, and is configured to control the power system circuit (switching circuit) mounted on the power system board 21.

The CPU board 30 is equipped with a controller area network (CAN), which is an in-vehicle LAN, as a form of communication with the vehicle. Therefore, a CAN receiver circuit constituting the control and communication circuit is provided on the CPU board 30, and a communication cable from higher-level control units provided at the vehicle side, that is, vehicle-side electric control units (ECUs) (control units), can be connected thereto. A CAN receiver circuit 31 for CAN communication is provided on the CPU board 30 and is connected to a CPU 33.

Next, a control system for controlling the electric compressor for the in-vehicle air conditioning apparatus will be described.

Figure 4:
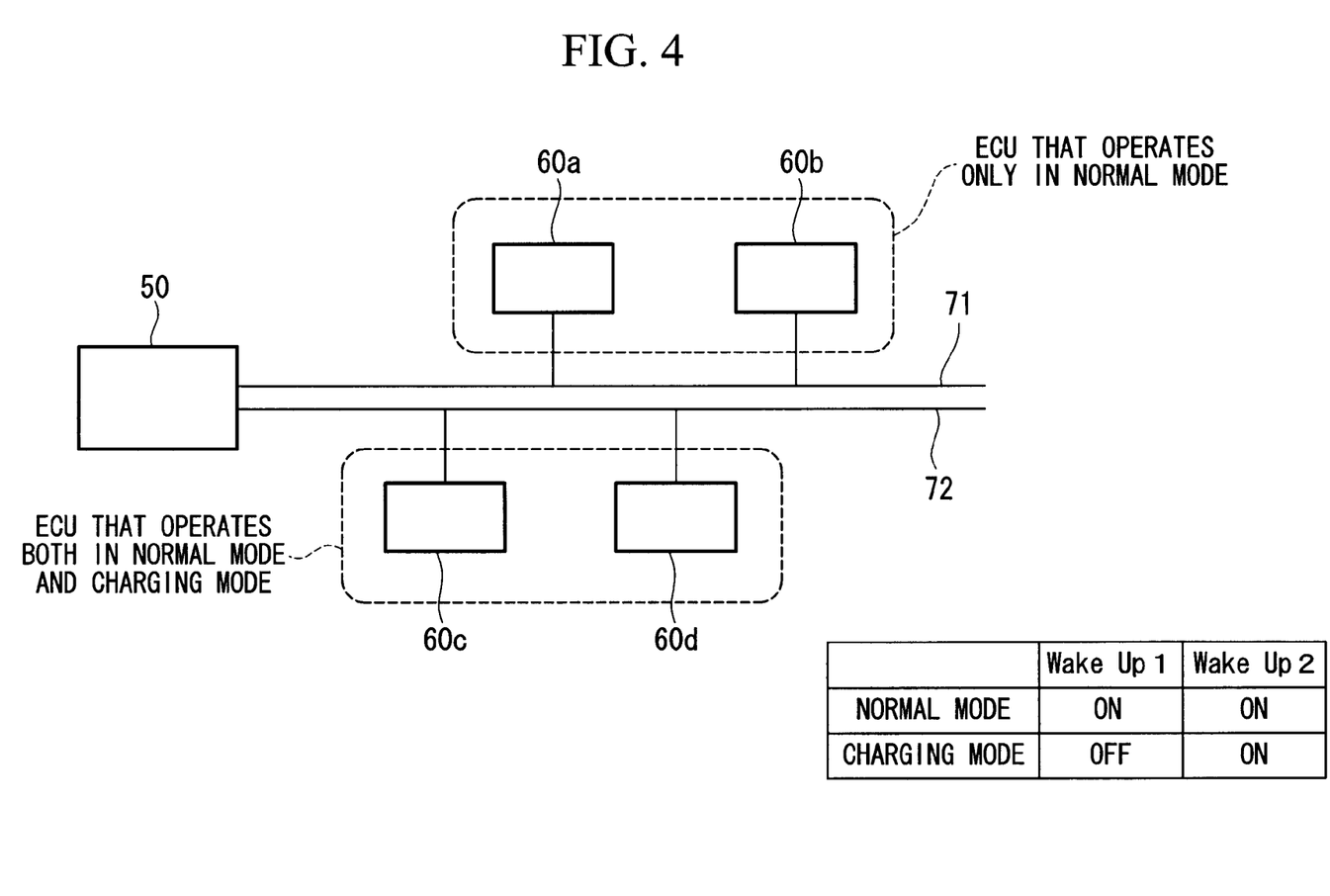
FIG. 4 is a circuit diagram of a vehicle-side control unit system for the inverter shown in FIG. 3.

As shown in FIG. 4, vehicle-side ECUs (control units) 60a to 60d and a signal control unit 50 are provided as a control system for controlling the electric compressor for the in-vehicle air conditioning apparatus.

In electric cars and hybrid cars, an electric compressor for an air conditioning apparatus is operated to cool a battery during charging of the battery. However, if all the vehicle-side ECUs 60a to 60d connected to the signal control unit 50 are turned on, the power becomes excessive, resulting in generation of wasteful power. In other words, there is no need to turn on all the vehicle-side ECUs; turning on only some of the vehicle-side ECUs allows for operation of the electric compressor necessary for cooling the battery. Thus, in this embodiment, the vehicle-side ECUs are divided into two systems, and a method for switching each system on and off depending on the operating mode of the vehicle will be described.

The vehicle-side ECUs 60a to 60d are divided into groups of the same combination of starting and stopping corresponding to the operating modes of the vehicle, and ECUs belonging to the same group are connected to each other with a common signal line. The individual signal lines are connected to the signal control unit 50.

Specifically, the vehicle-side ECUs 60a and 60b are turned on in a normal mode and are turned off in a charging mode and are connected to a first signal line 71. Likewise, the vehicle-side ECUs 60c and 60d are turned on in both the charging mode and the normal mode and are connected to a second signal line 72.

The signal control unit 50 sends an ON or an OFF signal, depending on the operating mode of the vehicle, to the signal lines.

Specifically, the signal control unit 50 sends a common ON or OFF signal to the vehicle-side ECUs 60a to 60d connected to form the same group, depending on the operating mode. For example, the first signal line 71 is turned on in the normal operating mode and is turned off in the charging mode. The second signal line 72 is turned on in both the normal operating mode and the charging mode.

The signal control unit 50 is a wakeup control ECU for transmitting a signal from a circuit other than an ordinary ignition circuit, such as a keyless entry system.

Note that examples of the operating modes include air conditioning during the normal operation of the vehicle, charging of the vehicle, regenerative power generation, driving, and plug-in charging.

Next, the operation of this embodiment will be described.

DC power that is supplied from the high-voltage power supply unit mounted in the vehicle to the inverter 20 of the electric compressor 1 through the high-voltage cable is input to the switching circuit of the power system board 21 through the P-N terminals 24 and is converted to three-phase AC power with a control command frequency by the switching operation of the semiconductor switching devices that are controlled by the control circuit on the CPU board 30 and is thereafter supplied to the electric motor in the motor housing 3 through the U-V-W terminals 25 and the glass-sealed terminal.

The inverter 20 is controlled by the control and communication circuit provided on the CPU board 30 on the basis of signals transmitted from the vehicle-side ECUs and the signal control unit provided at the vehicle side.

Thus, the electric motor of the electric compressor 1 is rotationally driven, and thus the compression mechanism is operated. By the operation of the compression mechanism, low-temperature, low-pressure refrigerant gas is taken into the motor housing 3 through the refrigerant intake port 6. The refrigerant flows around the electric motor in the direction of the motor axis L toward the compressor housing 4 and is taken into the compression mechanism, where it is compressed to a high-temperature, high-pressure state and is then expelled outside the electric compressor 1 through the discharge port 7.

During this process, the power system board 21 of the inverter 20 disposed in close contact with the bottom of the inverter accommodating portion 9 is cooled via the housing wall of the motor housing 3 by the low-temperature, low-pressure refrigerant gas that is taken into the motor housing 3 through the refrigerant intake port 6 and that is made to flow in the direction of the motor axis L. Thus, the heat-generating components, such as the semiconductor switching devices, mounted on the power system board 21 can be forcedly cooled, thus ensuring the heat-resistant performance of the inverter 20.

In electric cars, plug-in HEVs, etc., the electric compressor 1 for the air conditioning apparatus is operated to cool a battery during battery charging.

Next, the operation in which the electric compressor for the air conditioning apparatus is operated to cool a battery during battery charging will be described.

The vehicle-side ECU 60a and the vehicle-side ECU 60b connected to the first signal line 71 are turned on when driving in the normal mode and are used, for example, when the air conditioning apparatus is used as an air conditioner. Therefore, only when the vehicle is driven in the normal mode, an ON signal is transmitted from the signal control unit 50.

The vehicle-side ECUs 60c and 60d connected to the second signal line 72 are turned on in the case where only the electric compressor is operated in addition to the normal mode driving. Therefore, an ON signal is transmitted from the signal control unit 50 in the normal mode and in the charging mode.

For example, when the vehicle is to be charged by plugging it in, the signal control unit 50 sends out an ON signal only to the second signal line, with the first signal line in the OFF state. Thus, when the vehicle is to be charged by plugging it in, only the vehicle-side ECU 60c and the vehicle-side ECU 60d connected to the second signal line are turned on.

Thus, since only the electric compressor should be operated in the charging mode, only the second signal line is turned on, with the first signal line held OFF. This allows the electric compressor to be operated without the need for turning on electricity unnecessarily, thus reducing wasteful power consumption.

The present invention is not limited to the invention according to the embodiment described above, and modifications can be made as appropriate without departing from the spirit thereof. For example, in the above embodiment, although an example in which the inverter accommodating section 9 is formed integrally with the motor housing 3 is described, they are not necessarily formed integrally; a configuration in which a separate inverter accommodating section 9 is integrally mounted thereon may be adopted. The compression mechanism is not particularly limited; any type of compression mechanism may be used.

As has been described above, since the control system for the air conditioning apparatus according to this embodiment is configured such that the signal control unit changes signals to be output to the vehicle-side control units that are grouped depending on the amount of electricity consumed between an ON signal and an OFF signal, the number of vehicle-side control units to be operated can be limited, thus allowing power consumption to be reduced. Furthermore, since the signal lines are grouped depending on the power consumption, the devices can be easily turned on and off by the signal control unit controlling the ON and OFF signals.

Furthermore, the electronic control units and the signal control unit are connected by the signal lines that transmit ON and OFF signals. This can reduce the size of the board and the cost as compared with, for example, a case in which a communication line that allows communication between devices is added to perform control therewith.

Although the control system for the air conditioning apparatus according to this embodiment is provided with two systems of signal lines, the number of systems of the signal lines is not particularly limited. For example, three systems or four systems may be provided.

Furthermore, in the control system for the air conditioning apparatus according to this embodiment, although the signal control unit 50 is a wakeup ECU, it is not limited thereto. For example, it may be either a diagnostic ECU for operating a self-diagnosis function that checks whether devices (systems) connected to the vehicle-side ECUs 60a to 60d are operating normally, or dedicated ECUs provided in accordance with functions controlled by the vehicle-side ECUs.

REFERENCE SIGNS LIST 1 inverter-integrated electric compressor
20 inverter
21 power system board
30 CPU board
60a, 60b, 60c, 60d vehicle-side ECU
71 first signal line
72 second signal line

The invention claimed is:

1. A control system for an air conditioning apparatus mounted in a vehicle, comprising:
   a plurality of control units for controlling devices provided in the air conditioning apparatus; and
   a signal control unit that controls the plurality of control units,
   wherein the plurality of control units are divided into groups each having a common ON/OFF combination for individual operating modes of the vehicle, and the control units belonging to the same group are connected by a common signal line; and
   the signal control unit sends ON and OFF signals depending on the operating mode of the vehicle to the individual signal lines,
   the groups includes a first group having the plurality of control units connected by a first signal line, and a second group having the plurality of control units connected by a second signal line.

2. A control system for an air conditioning apparatus mounted in a vehicle according to claim 1, wherein:
   one of the first signal line and the second signal line is turned on in a normal operating mode and is turned off in a charging mode.

3. A control system for an air conditioning apparatus mounted in a vehicle according to claim 1, wherein:
   one of the first signal line and the second signal line is turned on in both a normal operating mode and a charging mode.

4. A control system for an air conditioning apparatus mounted in a vehicle according to claim 2, wherein the other of the first signal line and the second signal line is turned on in both a normal operating mode and a charging mode.

5. A control system for an air conditioning apparatus mounted in a vehicle according to claim 1, wherein:
   the operating modes include during the normal operation of the vehicle, charging of the vehicle, regenerative power generation, driving, or plug-in charging.

* * * * *